United States Patent
Miller et al.

(10) Patent No.: US 6,189,949 B1
(45) Date of Patent: Feb. 20, 2001

(54) VISOR WITH EXTENDER BLADE AND GUIDE THEREFOR

(75) Inventors: Douglas C. Miller, Hersey; Brian J. Rogalske, Holland; Michael S. Serbay, Plymouth; Robert W. Donaldson, Hudsonville; Douglas A. Fischer, Grand Rapids, all of MI (US)

(73) Assignee: Lear Donnelly Overhead Systems L.L.C., Novi, MI (US)

( * ) Notice: Under 35 U.S.C. 154(b), the term of this patent shall be extended for 0 days.

(21) Appl. No.: 09/204,796

(22) Filed: Dec. 3, 1998

(Under 37 CFR 1.47)

Related U.S. Application Data

(60) Provisional application No. 60/070,408, filed on Jan. 5, 1998.

(51) Int. Cl.[7] .......................................... B60J 3/00
(52) U.S. Cl. .......................................... 296/97.8; 296/97.1
(58) Field of Search .................. 296/97.1, 97.8, 296/97.6, 97.11

(56) References Cited

U.S. PATENT DOCUMENTS

| | | | |
|---|---|---|---|
| 2,667,222 | * 1/1954 | McCarthy et al. | 296/97.8 X |
| 4,264,100 | * 4/1981 | Keeler et al. | 296/97.8 |
| 4,810,023 | * 3/1989 | Kawada | 296/97.8 |
| 5,031,950 | * 7/1991 | Miller | 296/97.1 |
| 5,042,867 | * 8/1991 | Crotty, III et al. | 296/97.8 |
| 5,316,361 | * 5/1994 | Miller | 296/97.8 |
| 5,431,473 | * 7/1995 | Hiemstra | 296/97.8 |
| 5,445,427 | * 8/1995 | Vandagriff | 296/97.6 |
| 5,749,618 | * 5/1998 | Jones | 296/97.8 |
| 5,887,933 | * 3/1999 | Peterson | 296/97.1 |
| 5,984,398 | * 11/1999 | Crotty, III | 296/97.1 |

* cited by examiner

*Primary Examiner*—D. Glenn Dayoan
*Assistant Examiner*—Patricia Engle
(74) *Attorney, Agent, or Firm*—Brooks & Kushman P.C.

(57) ABSTRACT

A sun visor is disclosed having a body with an aperture through which an extender blade selectively slides between fully retracted and fully extended positions. The visor body is a clamshell type having first and second shell halves. A guide rib is located on one shell half to align and guide the extender blade as it moves into and out of the visor body. The aperture is formed by a recessed portion in at least one of the shell halves. Fabric covers the visor body and also extends into the aperture and covers at least part of the guide rib.

24 Claims, 2 Drawing Sheets

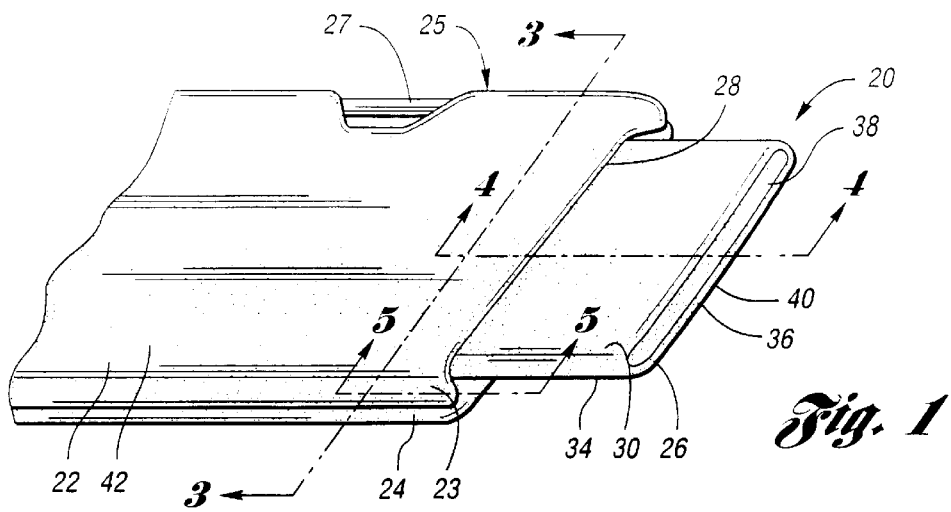
Fig. 1
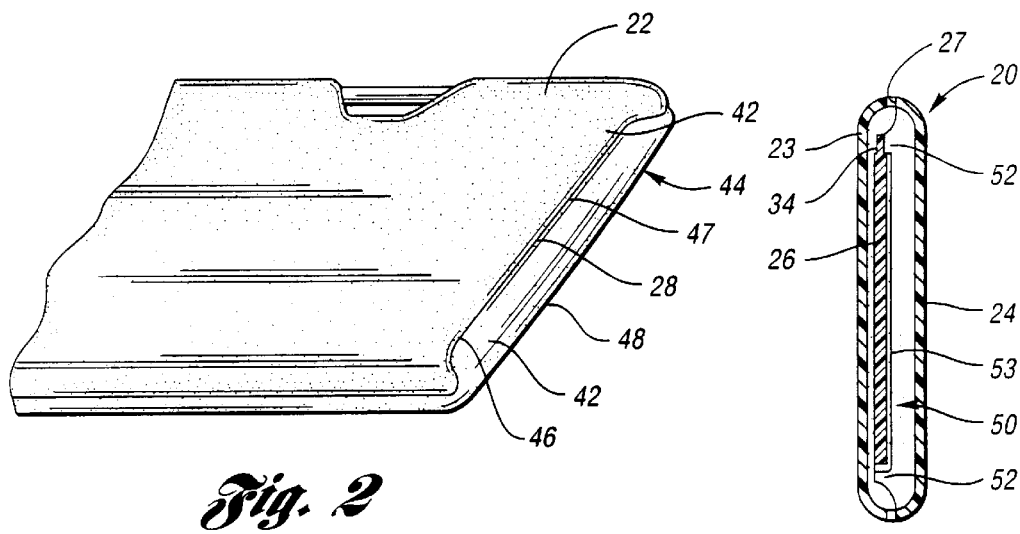
Fig. 2
Fig. 3
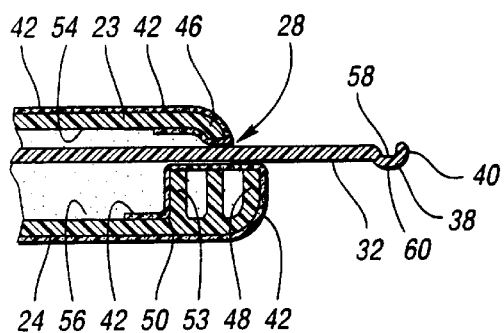
Fig. 4
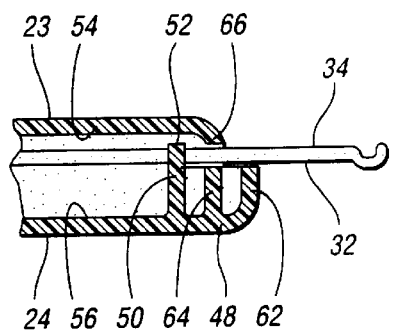
Fig. 5

VISOR WITH EXTENDER BLADE AND GUIDE THEREFOR

CROSS-REFERENCE TO RELATED APPLICATION

This application claims the benefit of U.S. Provisional Application Serial No. 60/070,408, filed on Jan. 5, 1998.

FIELD OF THE INVENTION

The invention relates to a sun visor for vehicles and, in particular, to a sun visor having a selectively extendible blade for increasing the sun visor surface area to provide greater shade and comfort for an occupant of a vehicle.

BACKGROUND OF THE INVENTION

Sun visors are provided in vehicles, such as automobiles, to block the sun from shining directly into an occupant's eyes. The visor usually pivots about a horizontal axis and can be stored in an uppermost position above, for example, a windshield. Conventional visors have a fixed size and are generally unable to block the sun, when the sun's ray is at a certain position.

It is known to provide a sliding extender blade that slides horizontally toward a center of a windshield to provide additional sun blocking area. Further, when the visor is pivoted to the side window, coverage is extended toward the "B-Pillar." However, previous designs have used extra parts, such as a bezel, to cover and "dress-up" the edges of the aperture through which the blade extends. In addition, because most extender blades are plastic, plastic-to-plastic contact with the bezel and/or visor body results. The plastic-to-plastic contact produces unwanted noise and an unpleasant "feel" for the user when extending and retracting an extender blade.

Another known device has a housing that attaches to a pre-existing sun visor and includes a pair of extendible panels to increase the sun blocking area of the original sun visor. One panel extends horizontally and the other panel extends vertically. A protective pad is attached to the outer surface of one panel to act as a buffer between the relatively moving panels.

However, the prior sun visors have poor appearance and poor operational "feel." Known visors include bezels to improve the appearance, but additional parts increase cost and assembly time. Noise is another drawback of existing sun visors having extendible blades with bezels. Plastic-to-plastic contact produces noisy operation.

SUMMARY OF THE INVENTION

The invention relates to a visor for a vehicle including a main body having spaced apart first and second walls defining a hollow recess. An aperture defined by two opposing edges of the first and second walls is located adjacent at least one side of the body in communication with the hollow recess. An extender blade is slidably received in the hollow recess and extends through the aperture. A fabric layer is provided covering at least one of the opposing edges of the wall for contact with the extender blade, as the extender blade slides relative to the aperture.

The invention further includes a visor for a vehicle having a main body with spaced apart first and second walls defining a hollow recess. An aperture is defined by two opposing edges of the first and second walls and located adjacent at least one side of the body in communication with the hollow recess. An extender blade is slidably received in the hollow recess and extends through the aperture. A fabric layer is coextensive with outer surfaces of the opposing edges. In addition, the extender blade has a return lip at an outer end thereof adapted to cover the end of the fabric on one of the opposing edges when the blade is in a retracted position.

The present invention is also directed to a sun visor having a body with an aperture through which an extender blade selectively slides between fully retracted and fully extended positions. The visor body is a clamshell type having first and second shell halves. A guide rib is located on at least one of the shell halves to align and guide the movement of the extender blade into and out of the visor body. The aperture is formed by a recessed portion in at least one of the shell halves. Fabric covers the visor body and also extends over an edge, into the aperture, and covers at least part of the guide rib. Edge wrapping of fabric in the aperture area provides a stylish appearance and eliminates plastic-to-plastic contact between the blade and the visor body. In addition, covering the aperture and guide rib with fabric improves the operational "feel" when extending and retracting the extender blade.

Another embodiment of the present invention eliminates the need for a separate bezel to cover raw edges of a slot cut in the visor fabric to permit passage of an extender blade. Instead, the present invention provides a lip integrally molded to a distal end of an extender blade and designed to overlap and conceal a raw fabric edge near a slot in the fabric, when the extender blade is retracted to a stored position. The lip has a generally U-shape portion which defines an elongated groove that receives, overlaps and conceals the raw fabric edge when the extender blade is fully retracted. When the extender blade is extended, the visor is rotated to a position at which the exposed raw fabric edge is not in direct view of a vehicle occupant.

Therefore, the invention provides an improved visor having a better appearance with reduced noise. The present design eliminates extra parts, such as a bezel, thus simplifying assembly and reducing overall costs.

BRIEF DESCRIPTION OF THE DRAWINGS

The features and inventive aspects of the invention will become more apparent upon reading the following detailed description, claims, and drawings, of which the following is a brief description:

FIG. 1 is perspective view of a sun visor according to the invention;

FIG. 2 is a perspective view of the sun visor of FIG. 1 without an extender blade;

FIG. 3 is a partial cross-sectional view of the visor of FIG. 1 taken along line 3—3 of FIG. 1 and without fabric;

FIG. 4 is a partial cross-sectional view taken along line 4—4 of FIG. 1; and

FIG. 5 is a partial cross-sectional view taken along line 5—5 of FIG. 1 and without fabric.

DETAILED DESCRIPTION OF PREFERRED EMBODIMENTS

Figure 6:
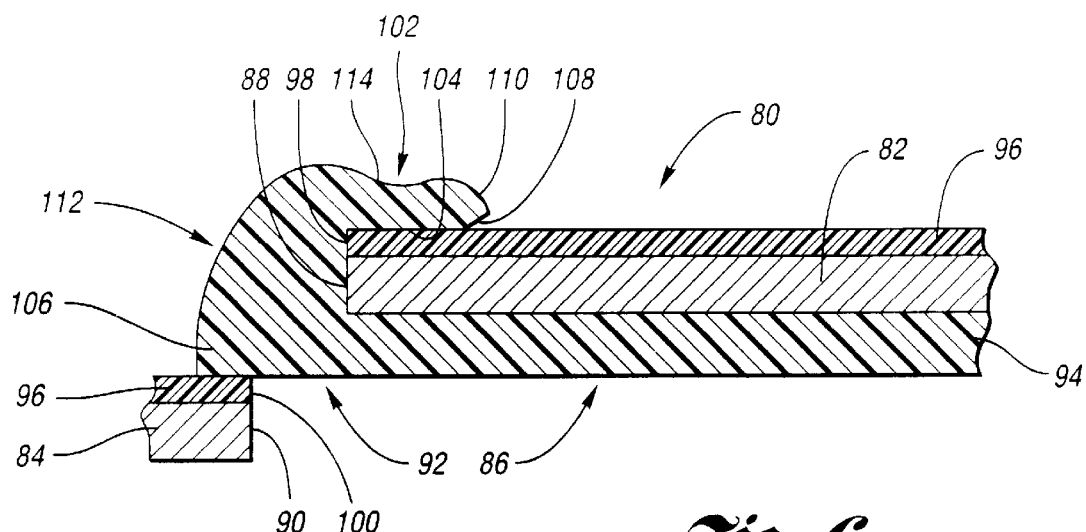
FIG. 6 is a partial cross-sectional view of a further embodiment of the present invention.

FIG. 1 shows a partial view of a clamshell-type sun visor 20 having a main body 22 with first and second shell halves 23, 24. First and second shell halves 23, 24 form a common edge 25 of an upper surface of the main body 22 of the visor 20. First and second shell halves 23, 24 are hingedly connected 27 at the common edge 25 to assemble the main body 22 of visor 20. An extender blade 26 is provided in visor 20 and can be selectively extended or retracted to increase the sun blocking area of visor 20. Extender blade 26 is slidably received in an aperture 28 that is located along an edge of main body 22. Extender blade 26 is a generally rectangular plate having an upper surface 30, a lower surface 32, and longitudinal side surfaces 34. One blade end 36 is shown extending laterally away from main body 22 and optionally includes a handle 38 near outermost end edge 40 to facilitate grasping extender blade 26. A fabric material 42 covers substantially all of the outer surfaces of visor 20. In addition, fabric 42 extends into and covers aperture 28 to reduce noise during extender blade 26 movement.

FIG. 2 shows visor main body 22 without extender blade 26. As more clearly shown, fabric 42 wraps over end edges 44 of main body 22, adjacent aperture 28 to provide a smooth, clean, stylish appearance. In addition, aperture 28 can be formed integrally into one or both of the clamshell halves 23, 24 by providing a recessed portion 46 formed by longitudinally offsetting clamshell half end edges 47, 48 with respect to each other.

FIG. 3 is a partial cross sectional view taken along line 3—3 of FIG. 1. Fabric 42 is not shown in this drawing to improve clarity. First and second shell halves 23, 24 surround extender blade 26. Guide rib 50, in the form of a U-shaped wall, is provided on at least one of shell halves 23, 24 to align and guide extender blade 26 by limiting its transverse movement. Preferably, guide rib 50 includes projections 52 that are located adjacent extender blade longitudinal side surfaces 34 to accurately guide extender blade 26. Projections 52 are laterally spaced apart by a web portion 53 extending between or from one or more projections 52 to form the U-shaped guide rib 50. The projections 52 and web portion 53 of U-shaped guide rib 50 can support extender blade 26 by contacting lower surface 32 of blade 26 with the web portion 53 of U-shaped guide rib 50.

Referring now to FIG. 4, fabric 42 extends inwardly into aperture 28 and covers clamshell half end edges 47, 48. Fabric 42 continues inwardly to cover guide rib 50 at web portion 53 and is secured to respective inner surfaces 54, 56 of first and second shell halves 23, 24 using, for example, adhesive bonding, staking, sonic welding, mechanical attachment, or any other suitable fastening technique.

Handle 38 is integrally formed in extender blade 26 near outermost edge 40 and includes a convex upper surface 58 and a concave lower surface 60. Handle 38 extends generally parallel to edge 44.

Referring now to FIG. 5 in which fabric 42 is not illustrated to improve clarity, inner surface 56 of second shell half 24 includes end edge 48 that is defined by a pair of spaced apart projecting edge lips 62, 64 extending inwardly towards the inner surface 54 of the opposing first clamshell half 23. In addition, inner surface 56 includes guide rib 50 located inboard of projecting edge lips 62, 64. Projections 52 of guide rib 50 extend upwardly adjacent longitudinal side surfaces 34 of blade 26. Preferably, projections 52 extend past side surfaces 34 for full surface engagement during guiding of blade 26. Additionally, first shell half 23 has a single edge lip 66 that is located somewhat outboard of guide rib 50 of second shell half 24.

FIG. 6 shows a further embodiment of the present invention which eliminates the need for a bezel that would otherwise cover raw edges of fabric on a visor near an aperture for an extender blade. In addition, the present invention eliminates the labor intensive task of tucking fabric over the edges and adhering the fabric to the visor interior. Specifically, FIG. 6 shows a partial cross-section of a visor 80 having a first shell half 82 spaced away from a second shell half 84 to define a hollow recess 86. First and second opposing edges 88, 90 are located on respective first and second shell halves 82, 84 to define an aperture 92 that is located adjacent at least one side of visor 80 in communication with hollow recess 86. An extender blade 94 is slidably received in hollow recess 86 and extends through aperture 92. In addition, a fabric layer 96 covers exterior surfaces of first and second shell halves 82, 84. Fabric 96 includes opposing edges 98, 100 that are coextensive with outer surfaces of first and second shell half opposing edges 88, 90. Preferably, opposing fabric edges 98, 100 are raw, unfinished edges resulting from a cutting operation. Fabric edges 98, 100 are not wrapped around first and second shell half opposing 88, 90 resulting in an otherwise unfinished-looking product. To provide a finished appearance, extender blade 94 includes a return lip 102 at an outer end thereof which is designed to cover opposing fabric edges 98, 100 when the blade is in a retracted position. Return lip 102 is located near a distal end of extender blade 94 and has a generally U-shaped configuration defining an elongated slot 104 for receiving and covering first opposing edge 88 and fabric edge 98 when extender blade 94 is in a retracted position. A corner 106 of return lip 102 extends past fabric edge 100 to provide a finished appearance. Optionally, return lip 102 includes a beveled portion 108 located at a leading upper edge 110 to help prevent snagging of fabric edge 98 and facilitate retraction of extender blade 94 to a fully retracted position. Return lip 102 further includes a generally arcuate handle portion 112 including a recessed groove 114 to improve gripping of visor blade 94.

Figure 7:
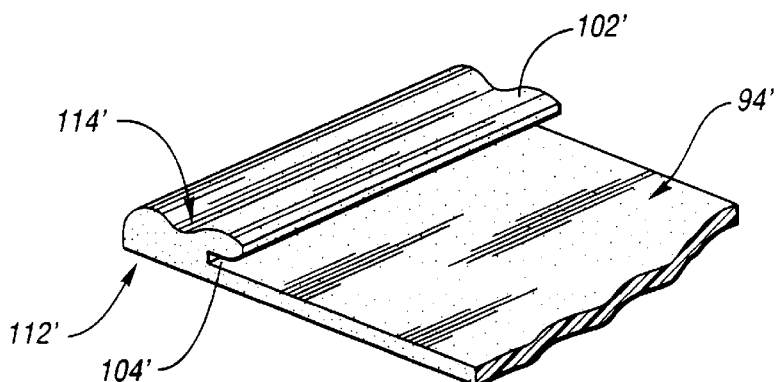
FIG. 7 shows a perspective view of an extender blade according to the second embodiment.

FIG. 7 shows a partial view of an extender blade 94' having a slightly elongated handle portion 112' where recessed groove 114' is located a distance spaced outwardly away from generally U-shaped return lip 102'. Handle 112' will have a variable length based on the longitudinal offset distance between opposing edges 88, 90 of visor 80. Elongated slot 104' and handle portion 112' are also illustrated in FIG. 7 as extending the same width as the extender blade 94'.

Figure 8:
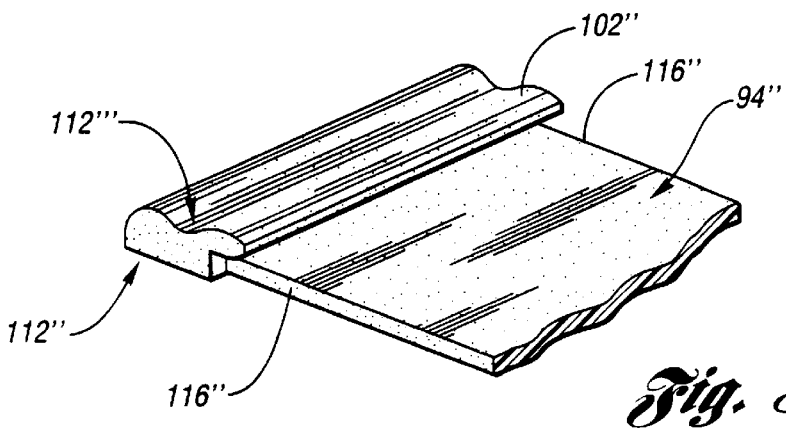
FIG. 8 shows another variation for an extender blade according to the present invention.

FIG. 8 shows a further extender blade 94" according to the present invention. Visor blade 94" has handle portion 112" and return lip 102" extending laterally beyond a side edge 116" of extender blade 94". Preferably, handle portion 112" and return lip 102" extend beyond both side surfaces 116" to account for assembly tolerances and variable aperture sizes and insure that raw fabric edges of the aperture are fully covered when extender blade 94" is retracted.

Although shell halves and extender blades have been described as made from plastic, any suitable materials can be used. Also, the specific shape and number of guide ribs can be varied as needed.

Preferred embodiments of the invention have been disclosed. A person of ordinary skill in the art would realize, however, that certain modifications would come within the teachings of this invention. Therefore, the following claims should be studied to determine the true scope and content of the invention.

What is claimed is:

1. A visor for a vehicle comprising:
   a main body having spaced apart first and second walls defining a hollow recess;

an aperture defined by two opposing edges of the first and second walls and located adjacent at least one side of the body in communication with the hollow recess;

an extender blade slidably received in the hollow recess and extending through the aperture;

a guide located on one of the first and second walls adjacent the aperture in confronting relationship with the extender blade to guide movement of the blade within the recess, wherein the guide includes one or more projections located adjacent longitudinal edge surfaces of the extender blade to limit transverse blade movement and a web portion extending from the one or more projections for supporting a face of the blade; and a fabric layer covering at least one of the opposing edges of the walls for contact with the extender blade as the extender blade slides relative to the aperture.

2. The visor of claim 1, wherein the first and second walls are hingedly connected at a common edge.

3. The visor of claim 1, wherein the guide is integrally formed with the walls.

4. The visor of claim 1, wherein the fabric layer covers at least a portion of the guide in contact with the extender blade.

5. The visor of claim 1, wherein the fabric layer covers the main body.

6. The visor of claim 1, wherein the opposing edges are longitudinally offset with respect to each other.

7. The visor of claim 1, wherein the guide includes at least one projecting lip on at least one of the opposing edges extending inwardly from one of the first and second walls towards an inner surface of the opposing first or second wall.

8. The visor of claim 7, wherein the at least one inwardly projecting lip includes a plurality of spaced apart inwardly projecting lips.

9. The visor of claim 8, wherein the fabric layer covers at least a portion of the inwardly projecting lips in contact with the extender blade.

10. The visor of claim 7, wherein the opposing edges are longitudinally offset with respect to each other.

11. The visor of claim 1, wherein the guide further includes a plurality of spaced apart inwardly projecting lips.

12. The visor of claim 11, wherein the fabric layer covers at least a portion of the projection and the inwardly projecting lips in contact with the extender blade.

13. The visor of claim 1, wherein the fabric layer covers each of the opposing edges.

14. The visor of claim 1, wherein the extender blade includes an outwardly projecting stop at an outer end thereof for contacting one of the opposing edges when the blade is in a retracted position.

15. The visor of claim 1, wherein the fabric layer covers one of the opposing edges and is coextensive with an outer surface of the other opposing edge and the extender blade has a return lip at an outer end thereof adapted to cover the end of the fabric on the other opposing edge when the blade is in a retracted position.

16. The visor of claim 15, wherein the return lip includes a bevel to prevent snagging of the fabric layer.

17. The visor of claim 15, wherein the opposing edges are longitudinally offset with respect to each other and the one opposing edge is located outwardly of the other opposing edge.

18. The visor of claim 15, wherein the extender blade return lip is generally U-shaped to define an elongated groove for reception of the other opposing edge and the fabric layer.

19. A visor for a vehicle comprising:

a main body having spaced apart first and second walls defining a hollow recess an aperture defined by two opposing edges of the first and second walls and located adjacent at least one side of the body in communication with the hollow recess an extender blade slidably received in the hollow recess and extending through the aperture a fabric layer is coextensive with outer surfaces of the opposing edges; and wherein the extender blade has a return lip at an outer end thereof adapted to cover the end of the fabric on one of the opposing edges when the blade is in a retracted position.

20. The visor of claim 19, wherein the extender blade return lip is generally U-shaped to define an elongated groove for reception of the other opposing edge and the fabric layer.

21. The visor of claim 19, wherein the return lip includes a bevel to prevent snagging of the fabric layer.

22. The visor of claim 19, wherein the opposing edges are longitudinally offset with respect to each other and the one opposing edge is located outwardly of the other opposing edge.

23. The visor of claim 19, wherein the return lip extends laterally beyond side edges of the extender blade.

24. A visor for a vehicle comprising:

a main body having spaced apart first and second walls defining a hollow recess;

an aperture defined by two opposing edges of the first and second walls and located adjacent at least one side of the body in communication with the hollow recess;

an extender blade slidably received in the hollow recess and extending through the aperture;

a guide located on one of the first and second walls adjacent the aperture in confronting relationship with the extender blade to guide movement of the blade within the recess, wherein the guide includes one or more projections located adjacent longitudinal edge surfaces of the extender blade to limit transverse blade movement, a web portion extending from the one or more projections for supporting a face of the blade and a plurality of spaced apart inwardly projecting lips; and a fabric layer covering at least one of the opposing edges of the walls, including the inwardly projecting lips for contact with the extender blade as the extender blade slides relative to the aperture.

* * * * *